UNITED STATES PATENT OFFICE.

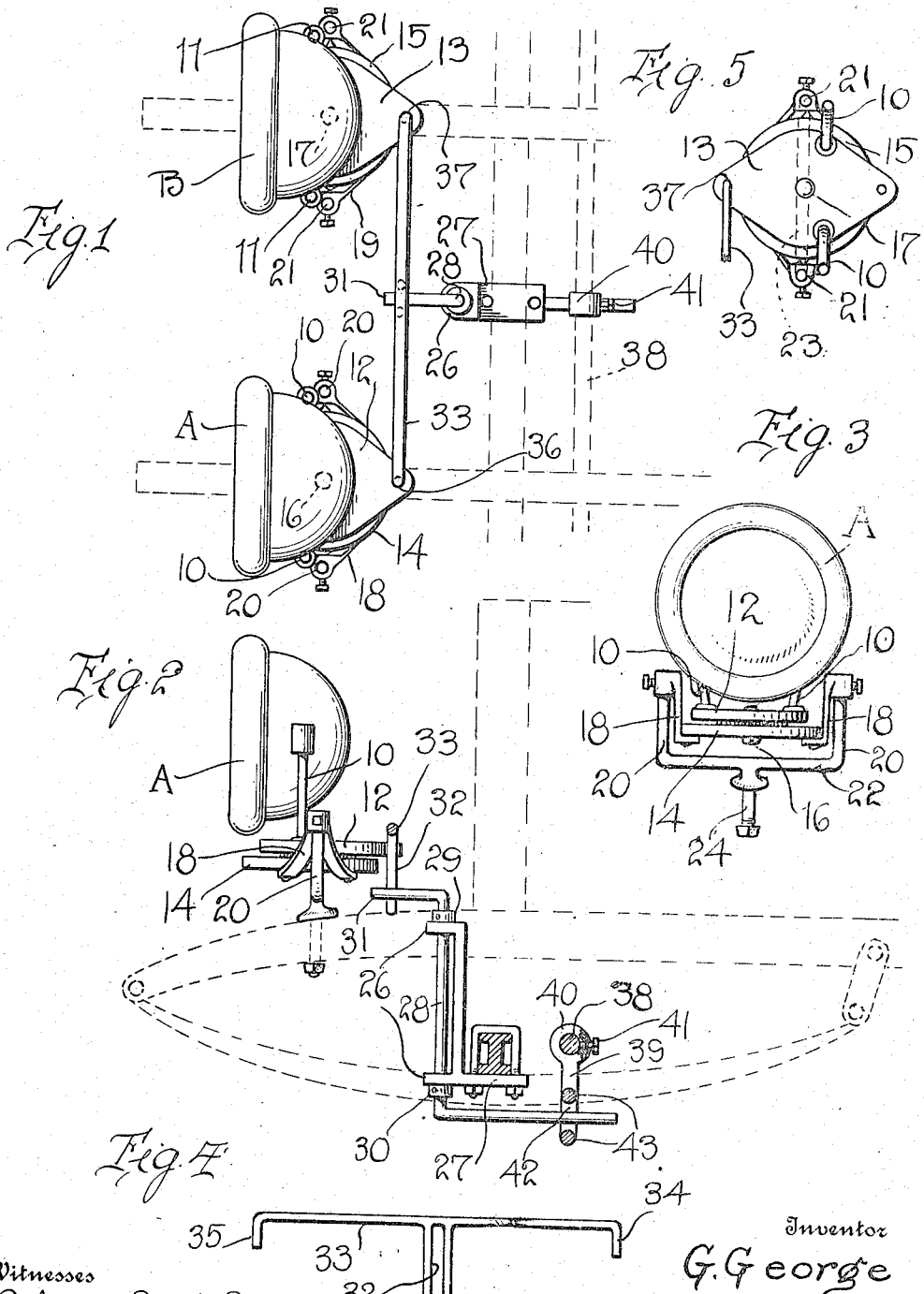

GROVER GEORGE, OF WILLIAMSFIELD, ILLINOIS, ASSIGNOR OF ONE-HALF TO EUGENE H. GALE, OF WILLIAMSFIELD, ILLINOIS.

STEERING APPARATUS FOR AUTOMOBILE-HEADLIGHTS.

1,144,033.

Specification of Letters Patent.

Patented June 22, 1915.

Application filed March 6, 1915. Serial No. 12,576.

*To all whom it may concern:*

Be it known that I, GROVER GEORGE, a citizen of the United States, residing at Williamsfield, in the county of Knox and State of Illinois, have invented certain new and useful Improvements in Steering Apparatus for Automobile-Headlights, of which the following is a specification, reference being had to the accompanying drawings.

My present invention relates to new and useful improvements in steering apparatus for automobile headlights and, as its principal object aims to provide a mechanism of this character which is relatively simple in construction and may be easily and quickly applied to any standard make of automobile, without requiring any material change in the construction thereof.

The above and other incidental objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention, as it is reduced to practice, and throughout the several views of which similar reference numerals designate corresponding parts, Figure 1 is a top plan view. Fig. 2 is a side elevation, looking at the inner side of one lamp. Fig. 3 is a front elevation of one lamp and its supporting bracket; Fig. 4 is a detail view of the connecting rod between the lamp brackets; and Fig. 5 is a detail view of a modified form of base plate which may be employed in connection with the head lamps.

As indicated at A and B in the accompanying drawings, the head lights of the automobile are mounted in the usual manner in a pair of fork arms 10 and 11. These members 10 and 11 are secured at their lower terminals in a pair of base plates 12 and 13 which are mounted for rotation on the supporting plates 14 and 15 and are held against displacement therefrom by the axles or pivot pins 16 and 17.

The supporting plates 14 and 15 are hung by metal straps 18 and 19 between the arms 20 and 21 of the U-shaped supporting brackets 22. Sockets 18' and 19', having set screws are employed in attaching the straps to the fork arms. These brackets 22 are provided with integrally formed shanks 24, which are attached by any suitable securing means to the side members 25 of the automobile chassis or any other portion of the vehicle. The supporting plates 14 and 15 are, of course, fixed with respect to the members 22 and 23 and these members are likewise held against movement with respect to the automobile. Rotatably mounted in a bearing 26, which is supported in advance of the automobile radiator by a bracket arm 27, is a shaft or axle 28. This member 28 is held against vertical movement by means of collars 29 and 30, which bear against the upper and lower ends of the bearings. The upper end of the axle or shaft is extended outwardly in a horizontal plane, producing the arm 31, the free terminal of which is freely mounted between the spaced depending arms 32 of a transverse connecting rod 33. The terminals of this rod 33 are bent at right angles, producing the stubs 34 and 35 which are adapted to be inserted in apertures 36 and 37 formed in the members 12 and 13.

The lower terminal of the axle 28 is extended rearwardly in a horizontal plane and is terminally connected to the transverse connecting rod 38. This connecting rod 38 as shown in the accompanying drawings, represents the customary transverse connecting rod which connects the steering knuckles of the front wheels in an ordinary automobile steering gear.

A link or bracket 39 is employed in connecting the members 30 and the horizontal portion of the member 28. This bracket 39 is provided with an eyelet or head 40 which embraces the rod 38 and is secured in position thereon by a set screw 41. Between the lower end of the arm 42, which constitutes the body of the bracket, extend a pair of vertically spaced transverse rods 43 between which the horizontal portion of the member 28 is disposed. The casing or horizontal portion of the member 28 is not fixed with respect to the rod 39 and it is obvious that the contracting or expanding of the springs will be compensated for by the movement of the horizontal portion of the member 28 between the rods 43. At this point, attention is directed to the fact that the terminal of the forwardly extending arm 31 of the member 28 is capable of vertical movement between the bearing arms 32 of the connecting rod 33, so that the vertical movement of this member 31, as a result of the contracting and expanding of the vehicle springs, will be also compensated for.

From the foregoing description it will be apparent that the headlights will be turned to follow the path of the vehicle in accordance with the movement of the wheel controlling rod 38.

The transverse movement of the controlling rod 38 will cause the swinging of the axle 28 and the resultant transverse movement of the connecting rod 33. The transverse movement of the connecting rod will be communicated to the base plates of the lamp fork, causing these members to turn to follow the path of travel of the vehicle.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined by the appended claims.

As disclosed in the modification of Fig. 5, the base plates 12 and 13 may be provided at diametrically opposite portions with extensions to permit the attachment of the connecting rod 33, either in advance of or in the rear of the lamps, so that the steering mechanism may be accommodated to automobiles of different lines.

What is claimed is:—

1. In a headlight steering mechanism for vehicles, a pair of supporting brackets, a lamp rotatably mounted in each bracket, a transverse connecting rod pivotally connected at its terminals to the lamps, a vertically disposed shaft rotatably secured to the axle of the vehicle, forwardly and rearwardly extending horizontal arms formed respectively on the upper and lower terminals of the shaft, a pair of transversely spaced vertical fingers carried by the connecting rod and receiving between them the forwardly extending arm, and a bracket attached to the transverse steering rod of the vehicle steering mechanism, said bracket being provided with vertically spaced rods, between which is disposed the rearwardly extending arm.

2. In a head light steering mechanism for vehicles, a pair of substantially U-shaped supporting brackets fixed to the vehicle, a pair of socket members detachably secured to the upper terminal of each arm of each bracket, a hanger strap depending from each socket member, a supporting plate secured to the hanger straps of each bracket, a base plate rotatably mounted on each supporting plate, a lamp supporting fork rising from each base plate, means operatively connecting the base plates, and means operatively connecting said means to the transverse connecting rod of the vehicle steering mechanism.

3. In a steering mechanism for vehicle head lamps, a pair of supporting brackets, base plates rotatably mounted therein for supporting the head lamps, a rod member connecting the base plates of the two lamps, and a pair of transversely spaced fingers depending from the rod, a vertically disposed shaft rotatably secured to the axle of the vehicle, a horizontal arm extending forwardly from the upper terminal of the shaft, said arm being disposed between the fingers and being engageable therewith for moving the connecting rod upon rotation of the shaft, said arm being vertically movable between the fingers, a horizontal arm extending rearwardly from the lower terminal of the shaft, and a bracket adapted to be secured to the transverse connecting rod of the vehicle steering mechanism, said bracket being provided with spaced vertical portions and spaced horizontal portions, said arm being freely disposed between the vertical and horizontal portions.

In testimony whereof I hereunto affix my signature in the presence of two witnesses.

GROVER GEORGE.

Witnesses:
ERASTUS W. PAINTER,
EDWARD M. MAHER.